United States Patent [19]

Parmentier

[11] 4,292,173

[45] Sep. 29, 1981

[54] VERTICAL FILTERING DEVICE

[76] Inventor: Alfred H. Parmentier, 69 Blvd. Machtens, B-1080 Brussels, Belgium

[21] Appl. No.: 160,707

[22] Filed: Jun. 18, 1980

Related U.S. Application Data

[63] Continuation of Ser. No. 37,085, May 8, 1979, abandoned.

[30] Foreign Application Priority Data

May 10, 1978 [FR] France .............................. 78 16002
Sep. 26, 1978 [FR] France .............................. 78 27472

[51] Int. Cl.³ ........................ B01D 25/34; B01D 25/12
[52] U.S. Cl. .................................... 210/138; 210/225; 210/231; 210/400
[58] Field of Search .............. 210/224, 225, 229, 230, 210/169, 400, 231, 138; 100/198; 74/568 T

[56] References Cited

U.S. PATENT DOCUMENTS

| | | | |
|---|---|---|---|
| 3,073,330 | 1/1963 | Fattor | 210/169 |
| 3,121,681 | 2/1964 | Baxter | 210/230 |
| 3,342,123 | 9/1967 | Ermakov et al. | 210/225 |
| 3,360,130 | 12/1967 | Kaga | 210/225 |
| 3,583,566 | 6/1971 | Meshengisser et al. | 210/225 |
| 3,695,440 | 10/1972 | Mori | 210/225 |
| 3,760,945 | 9/1973 | Davis | 210/143 |
| 3,968,040 | 7/1976 | Ostrop | 210/225 |
| 4,065,390 | 12/1977 | Schneider et al. | 210/225 |
| 4,155,830 | 5/1979 | Sukhobrusov et al. | 210/225 |

*Primary Examiner*—Charles N. Hart
*Assistant Examiner*—E. Rollins Cross
*Attorney, Agent, or Firm*—Sughrue, Mion, Zinn, Macpeak and Seas

[57] ABSTRACT

This invention relates to a vertical filtering device comprising a framework containing a plurality of horizontal superimposed filtering units, movable means for supporting the filtering units, the latter comprising each a movable frame with an inlet for the slurry to be filtered, a movable plate for the filtrate and an endless movable filtration band supported by two side rollers and extending between said frame and said plate, said supporting means being arranged so as to keep the filtering units stacked against each other during the filtering operation and so as to allow the parts of the filtering units to become spaced apart from each other when the filtration cakes have to be discharged.

According to this invention, the individual parts of the filtering units are independent from each other and the rollers of each filtering unit remain coaxial to the corresponding plate, whereas the filtering device comprises also (1) means for independently guiding the parts of the filtering units so as to maintain them permanently coaxial and (2) driving means for moving simultaneously, in the same direction, the endless filtering band of each of the filtering units. The independent side rollers of each filtration unit are carried by a shaft, the ends of which are inserted in movable bearings slidably guided in vertical guiding posts.

8 Claims, 13 Drawing Figures

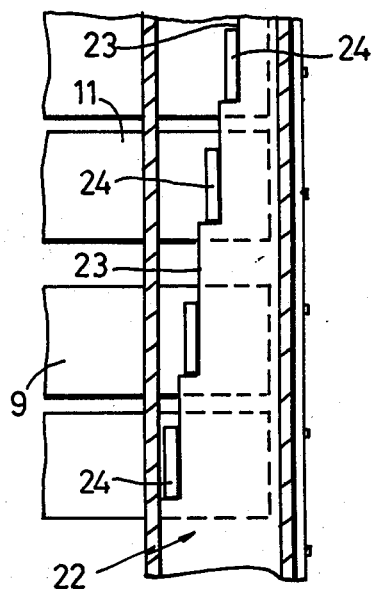
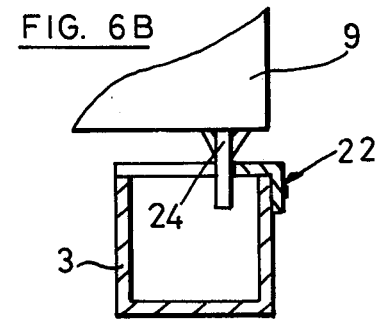
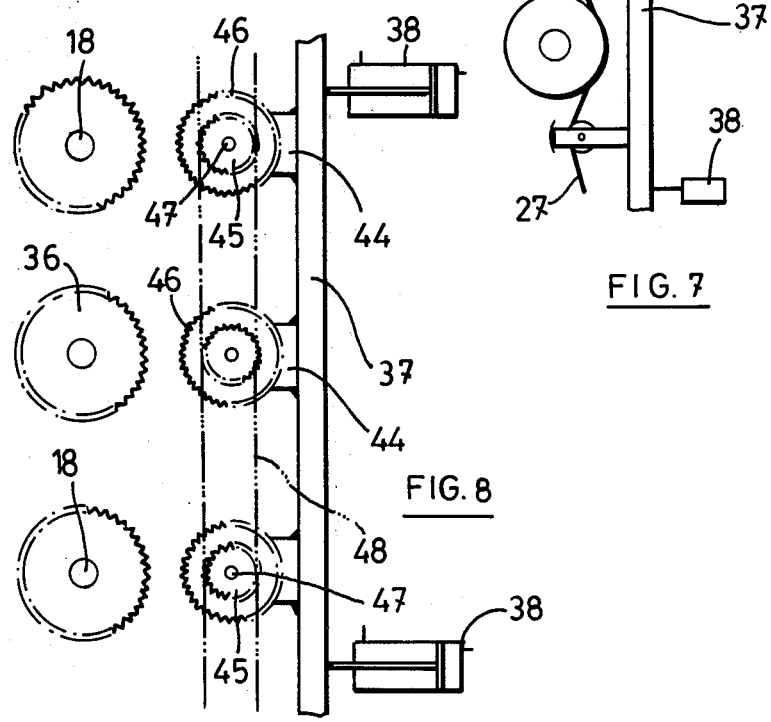

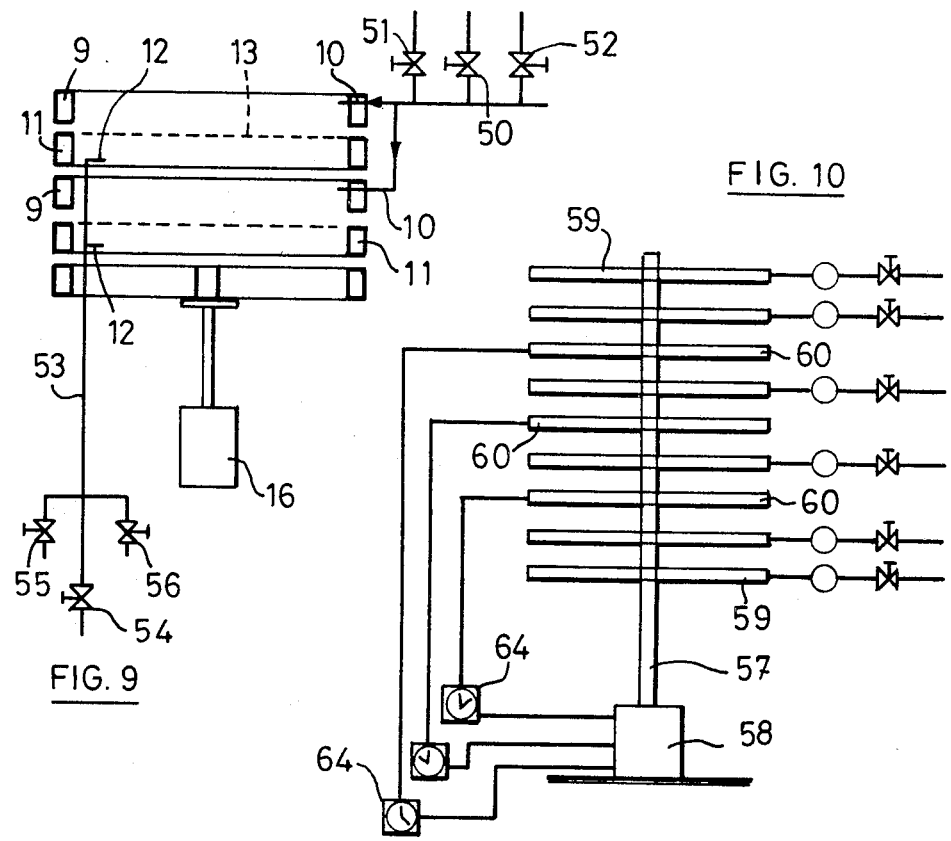
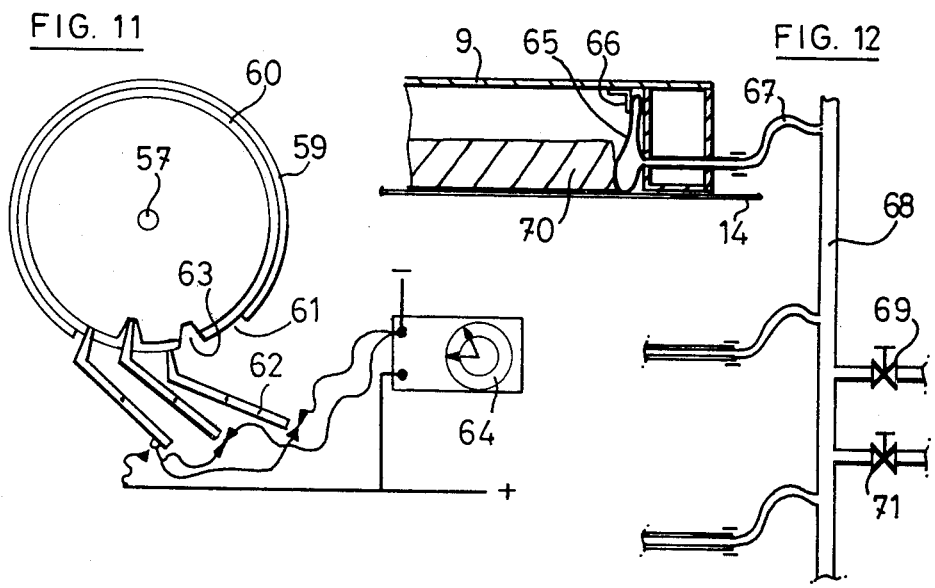

VERTICAL FILTERING DEVICE

This is a Continuation of application Ser. No. 37,085, filed May 8, 1979, now abandoned.

PRIOR ART

Filtering devices comprising horizontal superimposed filtering units are known. In these known filtering devices, each filtering unit comprises a frame with an inlet for the slurry to be filtered, a plate for the filtrate, and a movable filtration cloth band between the frame and the plate.

For the filtration, the filtering units are maintained against each other between a fixed framework and a movable structure supported by a jack. In order to enable the discharge of the filtration cakes formed on the filtration band, the frame and plate of each filtering unit are spaced apart and the filtration band is moved towards the discharge position.

In a particular known filtering device of the type described in the preceding paragraph, a single endless filtration band is used for all the filtering units, said filtration being supported in each filtering portion of the device by horizontal pairs of rollers, one of which is firmly attached to the frame, whereas the other roller is fixed to the plate, the single endless filtration band being guided outside the filtering portions along a plurality of rollers, such as a tensioning roller, a band centering roller, a plurality of band driving rollers, rollers for compensating the length of the filtration band, guiding rollers, etc.

Moreover, underneath each roller a scraper is firmly attached either to a frame or to a plate.

This known device needs a very heavy supporting equipement and a lot of energy for moving the single filtration band along a zig-zag path between the pair of rollers in the filtering portion and between the other rollers outside this portion, the discharge of the filtration cakes taking place on two opposite sides of the filtering device.

In this known device, a lot of time is spent to replace or repair the costly single endless filtration band, when necessary.

In this known filtering device, the parts of each filtering unit (frame, plate, pair of rollers supporting the filtration band or cloth and scraper) are all attached together and are dependent so as to form a single element, the plate occupying the lower position, whereas the frame is in the upper position.

The parts of the filtering units such as frame, roller and scraper or plate, roller and scraper are dependent from each other and with their supports are so heavy and so subject to mechanical efforts that the filtration units cannot be manufactured from plastic materials.

Another filtering device is known which however is horizontal and comprises vertical filtering units as in the well known classic filter-press. The filtering units are supported and guided as those of the classic filter-press. This known filtering device comprises double frames, each containing a median partition wall and two inflatable membranes extending on the whole surface of the frame, limiting two filtration chambers in which cakes are formed and afterwards pushed out by the membranes in order to try to stick the cakes on the filter cloth, which is an endless band around a plate having two opposite filtering surfaces.

To each double frame is strongly attached a fixed dependent scraper which must act at the extreme bottom of the lower roller of one adjacent plate as the distance between the double frame and said plate varies when the filtering device is open or closed, this arrangement creating a problem due to the efforts exerted on the scraper to remove the two cakes from the filtration band.

In any case, the use of a single scraper for two cakes is unsuitable, since one of the cakes has to be lifted and will fall down before reaching the scraper, with the result that the filtering device will be soon dirtily covered with the filtered solid.

The same remarks are made concerning means for the washing of the filter cloth, these means being also dependently fixed by supports to the same said frame bearing the scraper.

To each plate are also dependently fixed by supports two rollers, one at the top, the other at the bottom, the band of filter cloth being placed between these rollers.

To move the filter cloth numerous pieces are used and to drive the rollers, means are provided on the rollers and on a horizontal longitudinal shaft, in such a way that when suddenly rotating said shaft, the plate will leave its axial plane due to the fact that the plates are only supported and guided in a very simple way, as for a classic horizontal filter press.

BRIEF DESCRIPTION OF THE INVENTION

This invention relates to a filtering device which is much more easy to operate than the known above described filtering devices, without needing complex devices for guiding and driving the filtration band, for the removal of the cakes and for declogging the filtration cloth.

The vertical filtering device according to this invention which comprises a framework containing a plurality of horizontal superimposed filtering units, movable means for supporting the filtering units, the latter comprising a movable frame with an inlet for the slurry to be filtered, a movable plate for the filtrate, and an endless movable filtration band supported by two side rollers and extending between said frame and said plate, said supporting means being arranged so as to keep the filtering units stacked against each other during the filtering operation and so as to allow parts of the filtering units to become spaced apart from each other when the filtration cakes have to be discharged, is essentially charaterized by the fact that the individual parts of the filtering units are independent from each other and the rollers of each filtering unit remain coaxial to the corresponding plate, whereas the filtering device comprises also (1) means for independently guiding the parts of the filtering units so as to maintain them permanently coaxial and (2) driving means for moving simultaneously, in the same direction, the endless filtering band of each of the filtering units.

According to one embodiment of the filtering device of the invention, said driving means consists of a single driving element arranged so as to be able to act simultaneously on one roller of each pair of rollers supporting an endless filtration band and cause said rollers to rotate for bringing the section of the endless filtration bands supporting a filtration cake into a position where this filtration cake is discharged from said band, on the same side of the filtering units.

According to another feature of the filtering device according to the invention, the independent side rollers of each filtration unit are carried by a shaft, the ends of which are inserted in movable bearings slidably guided in vertical guiding posts.

The driving element of the filtering unit accordingly to this invention may be either an endless driving belt which is carried by pulleys and which may be engaged with or disengaged from pulleys carried by one roller of each of said roller pairs supporting an endless filtration band, or by an endless driving chain which is carried by pinions and may be engaged with or disengaged from pinions carried by one roller of each roller pair supporting an endless filtration band.

In this manner, when the parts of the filtering units (frame, plate, roller pairs, filtration band) have been vertically spaced from each other by gravity, due to the release of the supporting or tightening jack, the individual endless filtration band of each filtering unit can be moved simultaneously towards a common cake discharging position on the same side of the stack of filtering units. In the first described previously known device, the discharge of the filtration cakes takes place on opposite sides of the filtering units, whereas in the other previously known device the discharge of the cakes takes place all along the length of the horizontal filter-press.

According to an additional feature of the filtering device of the invention, the means for engaging the driving element with one roller of each roller pair and for disengaging said driving element from said roller consist of a series of vertically spaced pulleys or pinions carried by a common movable support and permanently engaged with said driving element, means being provided for acting on said common support so as to bring the driving element engaged with the pulleys or pinions carried by sadi support in a position where said driving element engages also the pulleys or pinions carried by the rollers or for removing said support from said position.

The filtering device according to this invention also comprises stops for retaining the parts of the filtering units apart from each other at a predetermined level, when the supporting means are released, so as to enable the simultaneous movement of the endless filtration bands towards the position where the filtration cakes are discharged therefrom, on one side only of the stack of filtering units.

In accordance with a further feature of the invention, an inflatable annular envelope is placed against the inner peripheral face of the frame of each filtering unit, said inflatable envelope being connected to a source of depression (vacuum) to flatten it against the frame before the slurry feeding and to a source of compressed air, so that it can be inflated for detaching the filtration cake from said frame.

The filtering device according to this invention is preferably automatized in its various steps, such as the steps of closing the filtering device by pressing the filtering units against each other, of starting the filtration of a slurry in the plurality of filtering units, of washing the cakes, of dewatering the cakes, of stopping the filtration, of opening the filtering device by allowing the parts of the filtering units to become spaced from each other by gravity, of moving the endless filtration bands towards the filtration cake discharge position and to repeat these steps, the latter being sequentially ordered and controlled by common means comprising timers and programmator connected in a suitable manner.

DETAILED DESCRIPTION OF THE INVENTION

Other features and details of the invention will appear in the following detailed description of an embodiment of the filtering device according to this invention, reference being made in said description to the attached drawings in which:

FIGS. 6a and 6b shows schematically means for guiding and stopping the frame and plate of each filtering unit at a predetermined level;

FIG. 7 shows schematically how the driving element of one roller of each roller pair is engaged with said roller, in order to enable the simultaneous movement of the endless filtration band of each filtering unit towards the filtration cake discharge position;

FIG. 8 shows schematically another system for engaging the driving element with one of the rollers of the roller pairs;

FIG. 9 shows the means for feeding the filtering units with a slurry to be filtered and for removing the filtrate from the collecting plates thereof;

FIGS. 10 and 11 represent diagrammatically a system for controlling the various steps of the operation of the filtering device according to this invention, and FIG. 12 is a view of the means used in the filtering device for detaching the filtration cakes from the frames.

Figure 1:
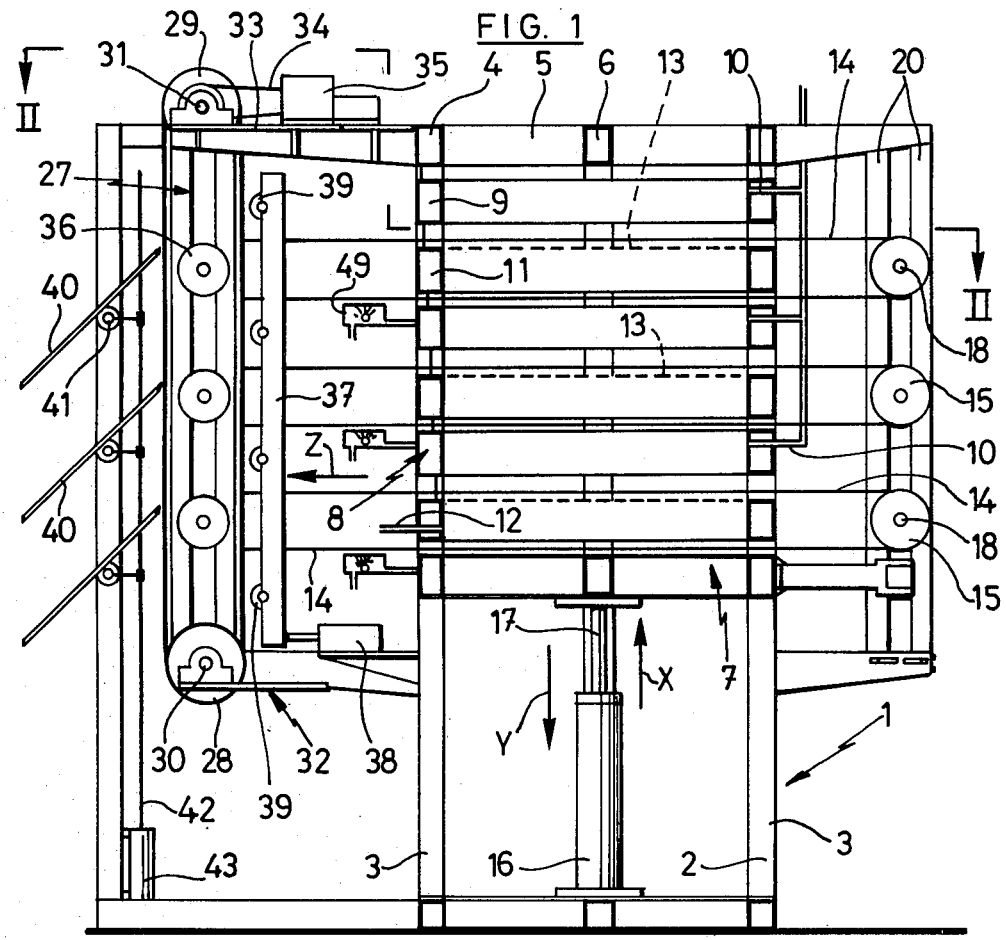
FIG. 1 is a front view, partly in section, of a filtering device according to this invention.
Figure 2:
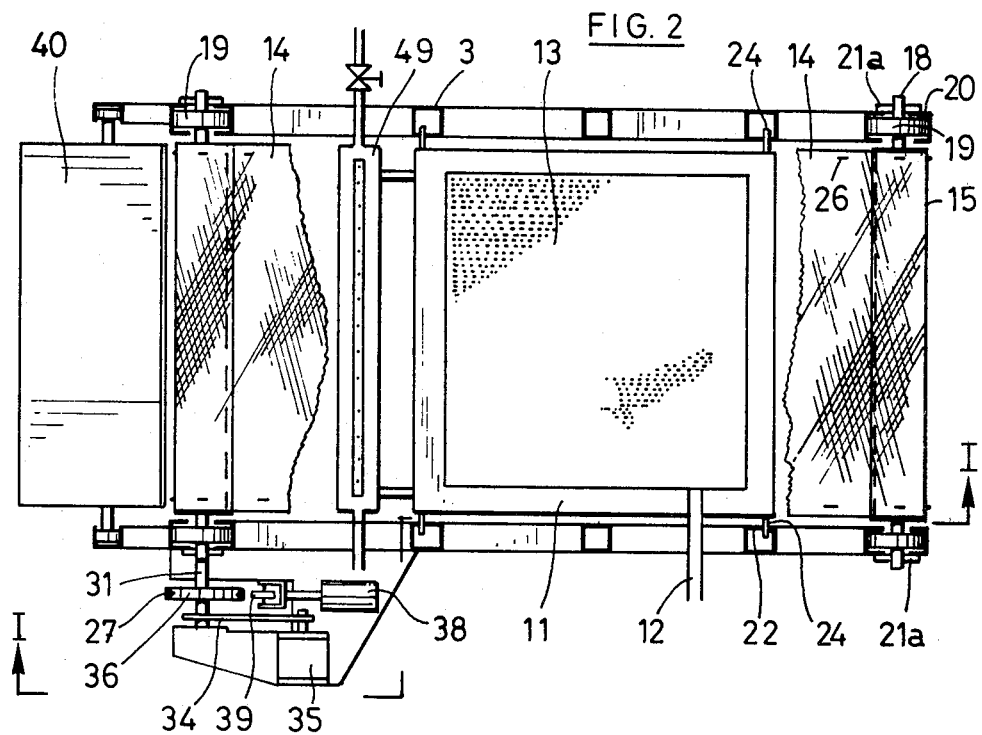
FIG. 2 is a plan view, partially in section along the line II—II of FIG. 1.

The vertical filtering device shown in FIGS. 1 and 2 comprises a framework 1 comprising essentially a bottom plate 2, several vertical pillars or beams 3 supported by the bottom plate 2 and connected to each other at their upper end 4 by cross-bars 5.

The filtering system comprises upper rigid horizontal pieces 6 which are fixed to the cross-bars 5 and a lower horizontal movable piece 7. Between the fixed piece 5, 6 and the movable rigid piece 7 are stacked a plurality of horizontal filtering units designated generally by reference 8.

Each filtering unit 8 comprises an upper movable frame 9 which has at least one inlet 10 for a slurry to be filtered, a lower movable plate 11 for collecting the filtrate which is discharged by at least one outlet 12, each filtrate plate having a perforated sheet 13 at its upper side.

Between the frame 9 and the filtrate collecting plate 11 extends a filtration cloth forming a part of an endless filtration band 14 supported by side rollers 15 which maintain said band under the required tension.

As can be seen from FIG. 1, each filtrate collecting plate 11 of each filtering unit 8 is entirely surrounded by an endless filtration band 14.

A pneumatic or hydraulic jack 16 supported by the bottom plate 2 is used for closing and for opening the filtering device. When the movable part or piston 17 of jack 16 is raised, it causes the movable rigid piece 7 and the filtering units 8 stacked upon said piece 7 to move in the direction of arrow X so that the filtering units 8 are tightened against each other between the movable rigid piece 7 and the fixed piece 6, the frame 9 and the collecting plate 11 of each filtering unit 8 being tightened against each other, the endless filtration band of each filtering unit 8 being squeezed, along one section thereof, between the frame 9 of a filtering unit 8 and the collecting plate 11 of the same filtering unit 8 and, along another part or section, between the bottom of the collecting plate 11 of one filtering unit 8 and the upper surface of the frame 9 of the following filtering unit 8. When the movable part 17 of the jack 16 has been completely raised, the filtering device is completely closed and a filtration may be started in each filtering unit 8 by admitting a slurry to be filtered, into each frame 9 through the inlet 10 thereof.

The inlet 10 of each filtering unit 8 may also be used for washing the filtration cake by means of a washing liquid and for drying said cake for example by means of a cold or hot compressed gas, such as air or another inert gas.

In FIG. 1, the several parts of the filtering units 8 have been shown in a position wherein there are slightly apart from each other, in order to show more clearly the component parts of said filtering units.

Figure 5:
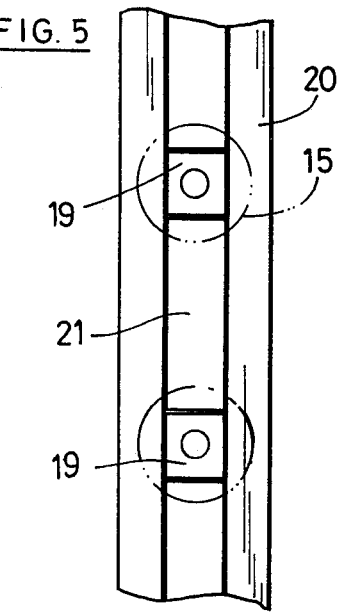
FIG. 5 shows schematically spacing elements maintaining a predetermined distance between the roller pairs of the superimposed filtering units.

Each roller 15 is fixed on a horizontal shaft 18, the ends of which are each inserted in a bearing 19. The bearings 19 are slidably guided in vertical guiding pillars or posts 20 consisting of two parts having a U-shaped section and having their open sides facing each other (as shown in FIG. 2). Spacing elements 21 are inserted between the bearings 19 in the guiding posts 20, in order to maintain permanently the shafts 18 and the rollers 15 at a predetermined distance from each other (FIG. 5).

For opening the filtering device, the movable part or piston 17 of the jack 16 is lowered in the direction of arrow Y so that the movable rigid piece 7, as well as the frames 9, the collecting plates 11 and the endless filtration bands 14 of the various filtering units 8 are free to move, under gravity, in the direction of arrow Y, the bearings 19 being guided during their downward movement (as well as during their upward movement) in the guiding posts 20. Stops 21a (see FIGS. 2, 3 and 4) fixed to the guiding posts are used for limiting the downward movement of the rollers 15. The downward movement of the frames and plates of each filtering unit is guided and stopped by a piece 22 fixed to the vertical beams 3, said piece having the shape of a flight of stairs, the vertical face 23 of each stair acting as a guide for staggered projections 24 of the frames 9 and of the plates 11 of the various filtering units, whereas the horizontal faces of the stairs limit the downward movement of said projections 24 of the frames 9 and plates 11 (see FIGS. 6a and 6b).

In the open position of the filtering device, i.e. when the various frames 9, collecting plates 11 and endless filtration bands 14 of each filtering unit 8 have been lowered to a position wherein there is no more contact between the frames 8 of said filtering units and the corresponding filtration bands 14, the filtration cakes formed on these bands 14 may be discharged.

Figure 3:
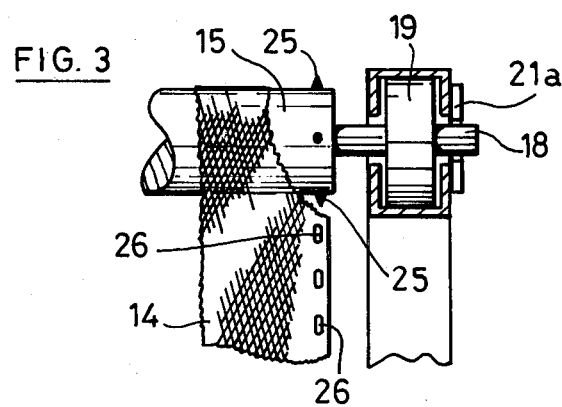
FIG. 3 shows a detail of the means for attaching the endless filtration band to one of the rollers of the roller pair supporting it.
Figure 4:
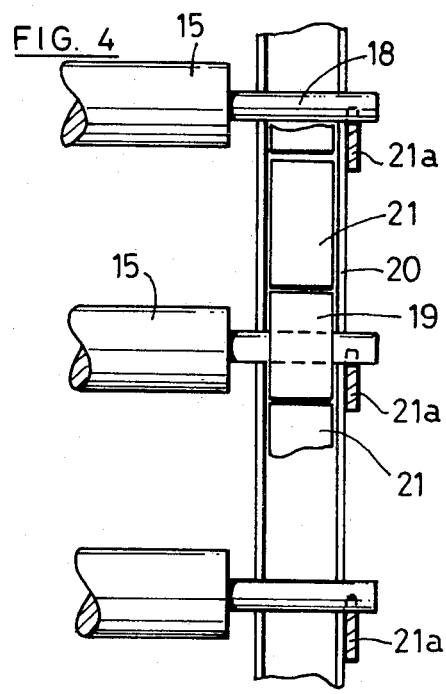
FIG. 4 shows schematically how the rollers supporting an endless filtration band of each filtering unit are maintained at a predetermined level when the parts of the filtering units are spaced from each other, i.e. when the filtering device is opened for enabling the discharge of the filtration cakes.

This discharge of the filtration cakes can be made by moving the endless filtration bands towards a discharge position by causing the rotation of one roller of each pair of rollers 15 supporting a filtration band 14. As shown in FIG. 3, the filtration bands 14 may be attached to a roller 15 by means of projections 25 for instance inserted in corresponding elongated eyelets 26 provided along the edges of the band 14.

In the embodiment shown in FIGS. 1 and 2, the rotation of a roller of each pair of rollers 15 may be operated by means of a single driving element, such as an endless chain or belt 27 passing around a lower pinion or pulley 28 and an upper pinion or pulley 29 carried by fixed shafts 30 and 31 respectively. These shafts are respectively carried by supports 32 and 33 attached to the framework 1. The pulley 29 can be rotated by means of a transmission belt or chain 34 cooperating with a speed reducer-motor assembly 35.

The shaft of each left side roller 15 of the roller pairs supporting the endless filtration bands 14 carries a pinion or pulley 36 having a smaller diameter than that of the lower pinion or pulley 28 and of the upper pinion or pulley 29, so that the driving element 27 is not engaged with the pinions or pulleys 36, allowing the free upward or downward movement of the rollers.

When the filtration cakes must be discharged from the filtration bands 14, means are used for causing an engagement between the driving chain or belt 27 and the pinions or pulleys 36 of the rollers 15. Said engagement means consist of a vertical beam 37 which may be moved in the direction of arrow Z by means of jacks 38, said beam supporting small pinions or pulleys 39 at levels between those of the pinions or pulleys 36.

FIG. 7 shows that, when the vertical beam 37 has been moved towards the left by means of the jacks 38, the driving element (belt or chain) 27 comes in contact with the pinions or pulleys 36 of the rollers 15 so that the driving element extends along a zig-zag path as shown in FIG. 7. When they are in this position, the pinions or pulleys 36 and the rollers 15 may be rotated counter-clockwise, so that the endless filtration bands 14 are moved towards the left, i.e. towards the filtration cake discharge position, at one side only of the filtering device.

This discharge of the filtration cakes is operated by means of adjustable scraping blades 40 which may each be adjusted by means of a rotary axis 41 carried by a vertical bar 42 which may be subjected to a vertical alternative movement by means of a jack 43 or an equivalent device, so as to give the required inclination to the scraping blades 40.

Another system for causing the counter-clockwise rotation of the rollers for discharging the filtration cakes is illustrated in FIG. 8. In this embodiment, the vertical support 37, which may be moved laterally by means of the jacks 38, is provided with individual supports 44 carrying each a small pinion or pulley 45 and a larger pinion or pulley 46 fixed on a common shaft 47.

An endless belt or chain 48 acting as a single driving element and connected to a driving motor in the same manner as the driving belt or chain 27 (see FIG. 1) is permanently in engagement with all the small pinions or pulleys 45.

When the support 37 is moved in the left direction the larger pinions or pulleys 46 are brought in contact with the corresponding pinions or pulleys of the rollers 15, so that when the driving belt or chain 48 is moved, the pinions or pulleys 46 engaged with the pinions or pulleys 36 cause a rotation of the rollers 15 and the displacement of the filtration bands 14 towards the filtration cake discharge position.

As shown in FIG. 1, the under section of each endless filtration band 14 may be washed by means of a spray distributor mounted in a collector 49, the latter being fixed to a frame 9 of the filtering unit located underneath the under section of each filtration band 14 or to the lower movable piece 7. The washing boxes 49 may also be attached to the plates 11.

FIG. 9 is a schematic view showing a part of the filtering device according to this invention, this figure illustrating particularly how the filtering units can be supplied and the filtrates collected. As already mentioned the frame 9 of each filtering unit 8 has an inlet 10, which is connected to a supply pipe. For the supply of a slurry to be filtered a valve 50 is opened, other valves 51 and 52 being provided for supplying respectively compressed air and a filtration cake washing liquid.

The removal of the filtrates collected in the plates 11 of the filtration units 8 takes place through a pipe 53 in which is inserted a valve 54 through which the dirty filtrates are removed. The removal of the rich filtrates takes place by opening a valve 55 in a pipe branched on the collecting pipe 53, whereas the washing liquid is removed through a valve 56 on another branch pipe connected to collecting pipe 53.

The operation of the various steps of the filtering device according to this invention may advantageously be controlled by a programmator which is shown schematically in FIGS. 10 and 11.

The programmator comprises a shaft 57 connected to a motor 58, the shaft carrying a series of main cams 59, auxiliary cams 60 being associated to some of the main cams 59. Each main cam 59 controls one of the steps of the successive steps of operation of the filtering device according to the invention. Thus, one main cam is provided for controlling the following steps:

(a) closing of the filtering device by the upward movement of the piston of the jack 16 for pressing the parts of the filtering units 8 against each other;

(b) supply of slurry to be filtered in the frame 9 of each filtering unit 8;

(c) supply of compressed air in the frames 9 of each filtering unit 8 for dewatering and/or drying the filtration cakes;

(d) supply of liquid for washing the filtration cakes;

(e) opening of the filtering device by a downward movement of the piston of the jack 16 so as to allow the parts of the various filtering units to become spaced from each other by gravity;

(f) simultaneous discharge of the filtration cakes by displacement of the endless filtration bands 14 on the rollers 15.

Some of these steps have a fixed duration, namely steps (a), (e) and (f), whereas the other steps may have variable durations, in accordance with the type of slurry to be filtered, pressure, temperature, flow-rates of liquids or gases, etc.

For the steps having a constant duration, one of the main cams 59 is used, said cam having a peripheral notch 61 of a length corresponding to the duration of the considered step, taking into account the rotation speed of the shaft 57. A feeling finger or lever 62 is maintained in contact with the periphery of each cam and when this feeling lever falls into a notch it operates a (not represented) control switch in an electric circuit, causing the starting of the considered step. When the feeling lever 62 leaves the notch in question, it opens the circuit controlling that specific step which is thus finished.

The notches 61 of the various main cams 59 are staggered from one main cam to the other main cam, so that the notches cover an angle of 360°.

For the steps which may have a variable duration such as steps (b), (c) and (d), an auxiliary cam 60 is associated with the notched main cam corresponding to the considered step. This auxiliary cam 60 has a V-shaped notch 63. When the duration of the step in question must be increased from a time T corresponding to the length of the notch 61 to a time T+t, the feeling finger or lever 62 corresponding to the auxiliary cam 60 falls into the V-shaped notch 63 and closes the circuit connected to a timer 64 which stops the motor 58, so that the rotation of the shaft 57 carrying the cams is interrupted during a period of time t selected by setting properly the timer 64, so that the duration of the considered step is controlled both by a main cam 59 and an auxiliary cam 60, so as to be of T+t.

By using the programmator with timers shown in FIGS. 10 and 11, it is easily possible to adjust the duration of steps (b), (c) and (d), so that these steps have a selected duration of $T+t_1$, $T+t_2$ and $T+t_3$, respectively.

FIG. 12 shows a system which may be used, in accordance with this invention, for detaching the filtration cake from the frame 9 of each filtering unit. This system comprises an inflatable annular envelope 65 maintained against the inside peripheral wall of each frame 9 by a strip or other piece 66. When the filtration cake has to be discharged from the filtration band, the annular envelope 65 is inflated by means of compressed air admitted in said envelope by a pipe 67 connected to another pipe 68 in which said compressed air is admitted through a valve 69.

Due to the inflating of the envelope 65, the filtration cake 70 is compressed laterally and thus detached from the frame 9. When the filtration cake has been discharged from the filtration band 14 as described above, the annular envelope 65 may be deflated by allowing the compressed air contained in it to be removed through the pipes 67, 68 and by opening an air discharge valve 71.

Due to the fact that each plate and each frame are independent from each other and are also independent from the rollers and the scraping blades, it is possible to operate the filtering unit in the following manners:

under pressure, the frames being fed under pressure with the slurry, the cake washing liquid and the compressed air, the collecting plates remaining at the atmospheric pressure;

under negative or reduced pressure, the frames being fed at the atmospheric pressure and a vacuum being applied to the plates;

both under pressure and under vacuum, for instance and filtration of the slurry taking place under a small differential pressure for the formation of the cake, the dewatering and the drying of the cake taking place under pressure, whereas a vacuum is applied to the collecting plates.

This invention is of course not limited to the above described details, since many of these details may be modified within the scope of the invention.

What I claim is:

1. A vertical filtering device comprising:

a framework carrying a plurality of independent horizontal superimposed coaxial filtering units including each:
  a frame with an inlet for a slurry to be filtered,
  a plate for collecting the filtrate with an outlet for said filtrate, and
  an individual endless filtration band supported by two side rollers independently from the frame and the plate of the filtering unit, said filtration band having a section extending between the plate and the frame and another section extending under the plate, the frame, the plate and the individual endless filtration band supported by the side rollers being independent from each other;
opening and closing means for allowing the independent frame, the independent plate and the independent individual endless filtration band of each filtering units and the independent filtering units themselves to be pressed against each other during each filtration step and for allowing said frame, said plate, said individual endless filtration band of each filtering unit, and said filtering units themselves to become spaced apart after each filtration step,
separate vertical guiding posts provided with slidably movable bearings in which the ends of a shaft carrying the rollers supporting each endless filtration band are inserted, stops being carried by said guiding posts for maintaining said bearings at predetermined levels in the open position of the filtering device,
vertical guiding means for the independent frames and plates of each filtering unit, said means comprising a portion having the shape of a flight of stairs, the vertical face of each stair acting as a guide for staggered projections of the frames and of the plates, whereas the horizontal faces of the stairs act as stops for limiting the downward movement of said projections of the frames and plates when the filtering device is opened,
means for simultaneously moving the individual endless filtration bands of the various filtering units, comprising a driving element operable to act simultaneously on one roller of each pair of independent side rollers supporting an endless filtration band and cause the said rollers to rotate for bringing the section of each endless filtration band supporting a filtration cake into a position where the filtration cakes are discharged from the said band, each of said discharge positions being on the same side of the filtering device, and
common controlling means including a cam programmer for sequentially controlling the durations of the steps of closing the filtering device by pressing the filtering units against each other, of filtering a slurry in the various filtering units, of washing the filtration cakes, of dewatering these cakes, of opening the filtering device by allowing the filtering units and the parts thereof to become spaced from each other, and of moving the endless filtration bands towards the filtration cake discharge position.

2. A vertical filtering device according to claim 1, in which means are provided for causing said driving element to be engaged with one roller of each roller pair or to be disengaged from the said roller.

3. A vertical filtering device according to claim 1, in which said driving element comprises an endless belt or chain which is engaged with pulleys or pinions carried by the shaft of one of each side roller pair supporting an endless filtration band, said belt or chain being moved by a common driving device.

4. A vertical filtering device according to claim 2, in which the means for causing the driving element to be engaged with one roller of each roller pair to be disengaged from the said roller, consists of a series of vertically spaced sets of two pulleys or pinions carried by a common movable support, one set of pulleys or pinions being permanently engaged with the said driving element, means being provided for acting on the said common support so as to bring the driving element in a position where the second set of pulleys or pinions is engaged with the pulleys or pinions carried by the roller shafts, or for removing the said support from the said position.

5. A filtering device according to claim 1, wherein adjacent the place where the filtration cakes are discharged from the endless filtration bands, the rollers carrying the said bands are provided on their periphery with projections engaged in elongate eyelets regularly distributed along the longitudinal edges of the endless filtration bands.

6. A filtering device according to claim 1, wherein an inflatable annular envelope is placed against the inner peripheral face of the frame of each filtering unit, the inflatable envelope being connected to a source of compressed fluid so that it can be inflated for detaching the filtration cake from the frame, and means for relaeasing the compressed fluid.

7. A filtering device according to claim 1, in which said cam programmer comprises a rotating shaft controlled by a motor and carrying a number of main cams corresponding to the number of steps to be performed, each main cam controlling the start and stop of a particular operation step, and auxiliary cams cooperating with the main cams so as to adjust selected ones of said duration by means of a timer.

8. A filtering device according to claim 1, in which said cam programmer comprises a rotating shaft controlled by a motor so as to rotate at such a speed that the time needed for one revolution is shorter than the time needed for a complete cycle of operation of steps, the said shaft carrying a number of main cams corresponding to the number of steps to be performed, each main cam controlling the start and the top of a particular step, and auxiliary cams cooperating with the main cams for varying the durations of selected ones of said stops by acting on a timer for each of the said steps of variable duration, the auxiliary cams stopping the revolution of the shaft during a step of variable duration for a time in order to reach the actual time needed for the said step, the timers being used for increasing or reducing the duration of a previous step.

* * * * *